(12) United States Patent
Capron et al.

(10) Patent No.: US 8,394,556 B2
(45) Date of Patent: Mar. 12, 2013

(54) IMPERMEABLE POROUS SUBSTRATE FOR PLANAR FUEL CELLS AND INTEGRATED PACKAGING

(75) Inventors: Philippe Capron, Luzinay (FR); Isabelle Rougeaux, Meylan (FR); Jérôme Delmas, Grenoble (FR); Audrey Martinent, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 432 days.

(21) Appl. No.: 12/632,076

(22) Filed: Dec. 7, 2009

(65) Prior Publication Data

US 2010/0098993 A1    Apr. 22, 2010

Related U.S. Application Data

(63) Continuation of application No. PCT/FR2008/050778, filed on Apr. 30, 2008.

(30) Foreign Application Priority Data

Jul. 10, 2007 (FR) ..................................... 07 56400

(51) Int. Cl.
*H01M 4/02* (2006.01)
*H01M 4/36* (2006.01)
*H01M 4/62* (2006.01)
*H01M 4/96* (2006.01)

(52) U.S. Cl. ...................... 429/533; 429/532

(58) Field of Classification Search .................... 429/532
See application file for complete search history.

(56) References Cited

U.S. PATENT DOCUMENTS

| 5,759,712 A | 6/1998 | Hockaday | |
|---|---|---|---|
| 6,042,958 A * | 3/2000 | Denton et al. | 429/492 |
| 6,159,628 A * | 12/2000 | Grasso et al. | 429/481 |
| 6,395,154 B1 * | 5/2002 | Stuart et al. | 204/253 |
| 2004/0048128 A1 | 3/2004 | Jankowksi et al. | |
| 2004/0072057 A1 | 4/2004 | Beatty et al. | |
| 2005/0079403 A1 * | 4/2005 | Lipka et al. | 429/44 |
| 2006/0188773 A1 * | 8/2006 | Andrin et al. | 429/44 |
| 2006/0194092 A1 * | 8/2006 | Kanai et al. | 429/34 |

FOREIGN PATENT DOCUMENTS

| WO | 2007/036705 A1 | 4/2007 |
|---|---|---|
| WO | WO2007/036705 | * 4/2007 |

OTHER PUBLICATIONS

J.S. Wainright et al., "*Microfabricated Fuel Cells*," Electrochimica Acta, vol. 48, 2003, pp. 2869-2877.

* cited by examiner

*Primary Examiner* — Barbara Gilliam
*Assistant Examiner* — Steven Scully
(74) *Attorney, Agent, or Firm* — Burr & Brown

(57) ABSTRACT

The present invention relates to a support for a planar fuel cell core, produced using a material permeable to the fuel of the cell, and sealed over at least one of its outer faces.

8 Claims, 2 Drawing Sheets

IMPERMEABLE POROUS SUBSTRATE FOR PLANAR FUEL CELLS AND INTEGRATED PACKAGING

FIELD OF THE INVENTION

The present invention relates to the field of solid polymer electrolyte fuel cells, and the implementation thereof in generating electrical power from a few hundred milliwatts to a few tens of watts for portable uses.

The invention relates more specifically to a method of developing the cell core in planar fuel cells, and is based on the use of a sealed porous substrate.

Said invention relates to hydrogen fuel cells, but also to fuel cells involving liquids, such as methanol, ethanol, formic acid, ethylene glycol or solutions of sodium borohydride. It also relates to anionic or cationic electrolyte fuel cells.

BACKGROUND OF THE INVENTION

There are on the whole two types of architecture for fuel cells:
  filter press architecture comprises stacking a plurality of fuel cell cores. Said first architecture is generally preferred where high-power uses are involved.
  alternatively, planar architecture comprises juxtaposing a plurality of fuel cell cores in the same plane. Said second implementation is, for its part, preferred for low-power uses of the nomad or portable type. It is to this type of architecture that the present invention applies.

Planar architecture uses in the main two fabrication technologies:

The first technology comprises using an electrode—membrane—commercial electrode (cell core) assembly deposited onto a substrate that is permeable by means of a porous material, as disclosed for example in U.S. Pat. No. 5,759,712.

The second technology comprises using another type of permeable substrate as cell core support, as disclosed in the publication by J. S. Wainright et al. <<*Microfabricated fuel cell*>>, *Electrochimica Acta*, Volume 48 (2003), Pages 2869-77.

Said cell core 1 is fabricated by stacking successive layers of materials constituting said core (current collectors 10, active layers 11 and membrane), as shown in FIG. 1. As set forth in this figure, the permeable substrate 2 is made out of silicon, and is engraved with channels 4 to allow the hydrogen to reach the cell core 1.

Thus, on a single substrate 2 a plurality of cell cores 1 can be fabricated which, when put in series, provide a generator that has the required electrical characteristics (cf. FIG. 2). Indeed and in said design, the number of cell cores defines the system voltage, and the surface of the cell cores defines the available current.

Said cell, once produced, needs to be integrated into a "packaging", to allow a "connection" with the fuel. Said "packaging" 3, shown in FIG. 2, is connected to a cartridge constituting a fuel tank, thereby allowing the cell anode to be supplied with fuel. Furthermore, it ensures the impermeability of the system. Said "packaging" therefore constitutes a protective cover, which may take the form of a detachable and sealed cap.

As a consequence, two "inert" materials are used when fabricating a fuel cell of this kind: that constituting the substrate 2 or support for the cell cores 1, and that constituting the "packaging" 3. Their integration in the fuel cell involves additional cutting and assembly stages, which make said embodiment relatively unattractive.

There is therefore a need to develop new planar fuel cell designs, for which the method of fabrication is more straightforward and faster to implement.

SUMMARY OF THE INVENTION

The invention is based on the use, as substrate or support for a cell core in planar fuel cells, of a material that is both permeable to the fuel of the cell, but also sealed on at least one of its outer faces.

It is thus the same material that has on the one hand a porous or permeable area for diffusing the fuel and intended to be in contact with the cell, and on the other hand at least one impermeable or sealed (and therefore non-porous and non-permeable) area which surrounds the porous area and is in contact with the outside.

It is in fact the porous or permeable material which is locally sealed or compact. In performing these two antagonistic (permeability/impermeability) functions through the use of a single material the homogeneity of the structure is ensured and fabricating methods are simplified.

The permeability to fuel of the material acting as the support is to advantage ensured by two means:

As disclosed by a first aspect of the invention, said material is provided with channels. This is done to advantage by engraving, as reported in the prior art in particular in respect of silicon.

Alternatively and as disclosed by a second aspect, the permeable material is a porous material.

Indeed, it has been demonstrated in the context of the invention, that the engraved silicon could easily be replaced by a porous material, whereof the characteristics, in terms of fuel diffusion and substrate, are very close.

It is thus possible to produce cell cores by stacking successive layers onto a porous material, while retaining good fuel diffusion capacity and while retaining the same fabricating methods.

To advantage, a porous material as disclosed by the invention has a porosity rate (ratio of void volume to total volume) of between 40 and 80%, to advantage with a pore size of between 0.5 and 40 μm. Said characteristics relate to the initial material implemented and are only found, therefore, as far as the substrate is concerned, in the non-sealed part of the substrate.

To advantage and given the targeted "fuel cell" use, the inventive substrate has a thickness of between 1 and 5 mm.

In a preferred embodiment, the material used is a polymer, and to even greater advantage belongs to the class of thermoplastic polymers such as polyolefin, polyester, polyamide, or fluorinated polymer etc, and to be more specific polyethylene or polyvinylidene fluoride (PVDF) homopolymer or copolymer with hexafluoropropene. Said polymers have a softening temperature of between 100 and 200° C.

In the context of the invention, an adapted material must have at least two qualities: be permeable and electrically conductive.

In the preferred case of a polymer made permeable by porosity, if a material is not intrinsically porous, it may become so. If some porous polymers are commercially available, other polymers may be made porous by extrusion with a porogenous agent or by polymer grain sintering.

Furthermore, if a material is not intrinsically electrically conductive, an electrical conductor may be added to it.

Such a material may also have a tank function where liquid fuel such as methanol, ethanol etc, is involved.

As disclosed by one essential characteristic of the invention, the support is sealed over at least one of its outer faces.

Logically, the surfaces for sealing are those which are not destined to come into contact with the cell cores and in particular those in contact with the fuel tank.

To great advantage, the selected material is a polymer that has the characteristic of being thermoplastic, in other words capable of softening under the effect of heat. As a consequence, a rise in the localized and peripheral temperature, applied over the entire accessible surface of the permeable polymer after the layers are stacked, causes a deformation of the material. Said softening enables the channels or the pores of the material to be filled and a dense layer to be obtained. The integrated cell assembly thus has a fuel diffusion area, while being impermeable relative to the outside and to the cathode.

The present invention thus additionally gives freedom from bringing in an additional cap to perform the impermeability function.

As a consequence, the new invention also confers on the system a more compact aspect, thereby giving it a better power density in W/kg or W/l.

As disclosed by another aspect, the invention relates to a planar fuel cell including at least one cell core, and to advantage a plurality thereof, positioned on the outer non-sealed face of a support as previously disclosed.

The invention also relates to the method of fabricating said planar fuel cell. It includes the following steps:
- preparing a permeable and electrically conductive support;
- stacking successive layers to form the cell cores on one of the outer faces;
- sealing the other faces.

As already said, preparing the support may involve adding an electrically conductive material and/or making it porous.

In the second step, the cell core is constituted on one of the faces of the support, by successive stacking of the layers: current collectors, active layers and membrane.

The faces of the substrate unoccupied by the cell cores are then sealed.

In the preferred situation where the material used for the support is a thermoplastic polymer, it is sealed by exposing the surfaces unoccupied by the cell cores to a temperature above the softening temperature of the material, typically of between 100 and 200° C. There then occurs a surface softening that generates a dense outer layer.

In practice and in one preferred embodiment, the support is placed in a mould with adapted dimensions and said mould is brought to the appropriate temperature.

BRIEF DESCRIPTION OF THE DRAWINGS

The way in which the invention can be implemented, and the resulting advantages, will become clearer from the following embodiment example, given by way of information and non-restrictively, supported by the appended figures.

DETAILED DESCRIPTION OF THE INVENTION

A polyethylene substrate 2, having 40% porosity with pores of 20 μm, and having a thickness of 1.6 mm is used as a support for stacking the cell core 1.

As disclosed by the invention, the first step comprises depositing a first layer of gold acting as electronic collector 10. The active anode layer 11 is then deposited by sputtering. Said layer contains a catalyst, in the case in point platinum. It is deposited locally like the gold layer, to form in the end a plurality of cell cores of 1 cm$^2$.

Figure 1:
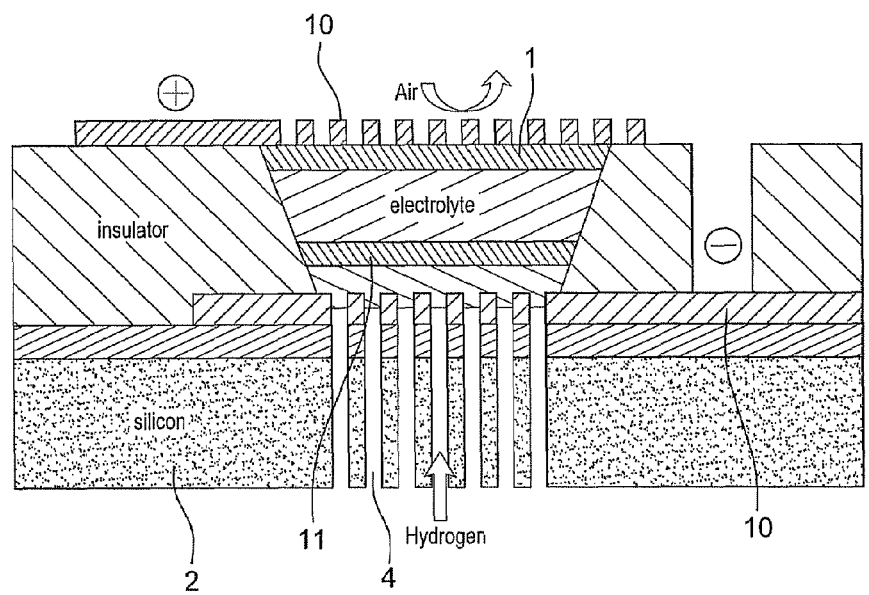
FIG. 1 shows a diagrammatic cross-section view of the cell core positioned on a support as disclosed by the prior art.
Figure 2:
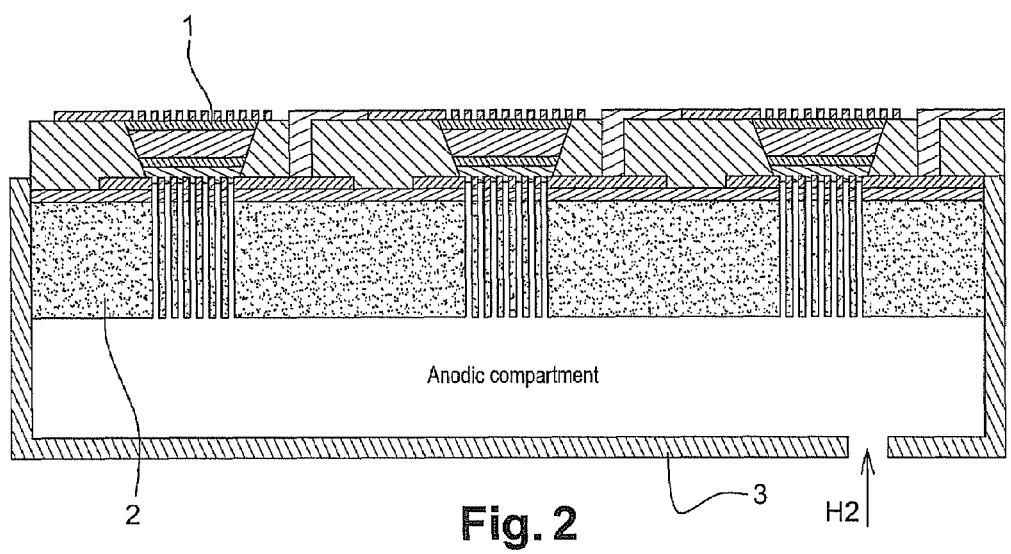
FIG. 2 shows a diagrammatic cross-section view of a planar fuel cell, including three cell cores arranged on a support, and encased in impermeable "packaging" as disclosed by the prior art.
Figure 3:
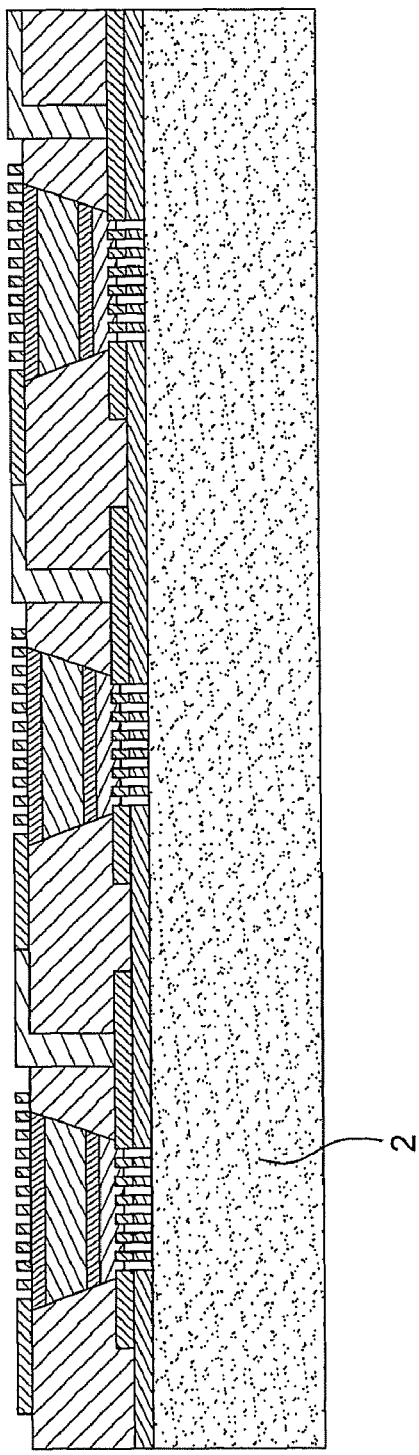
FIG. 3 shows a diagrammatic cross-section view of three cell cores positioned in a single plane, on a porous substrate as disclosed by the invention.

A solution of Nafion® (trademark Dupont de Nemours), corresponding to a dispersion of sulfonated perfluorinated polymers, is then deposited by coating over the whole surface of the substrate. The active cathode layer 11 is then applied by sputtering, in the same way as the anode layer, also localized opposite the cathode layer (FIG. 3).

This assembly is then placed in a mould with dimensions appropriate to the size of the substrate 2. The assembly is placed under 1 bar of pressure for 20 seconds, the mould being brought to a temperature of 100° C. The assembly is then taken out of the mould.

Figure 4:
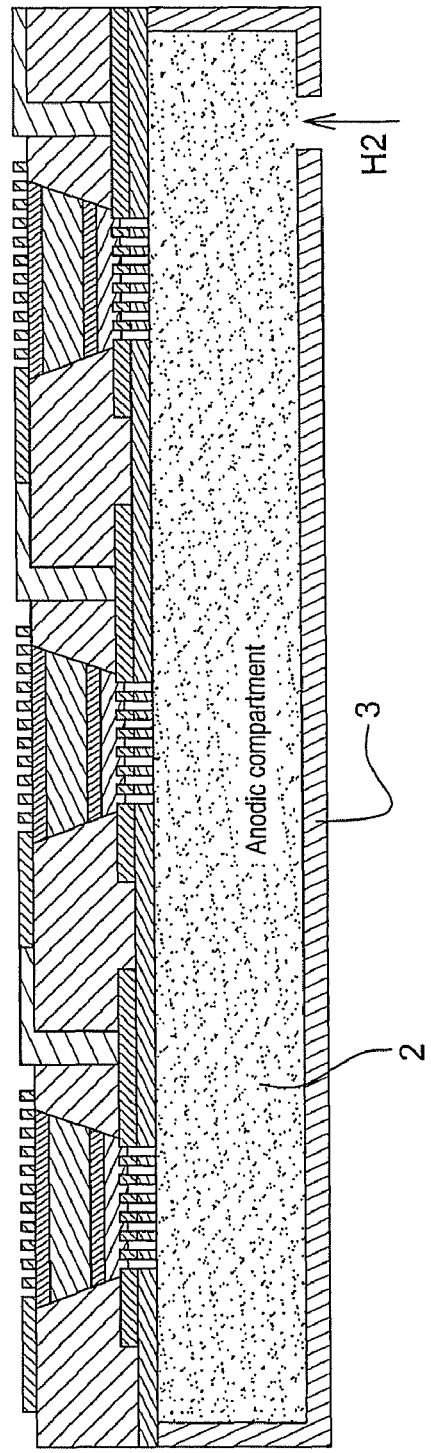
FIG. 4 shows a diagrammatic cross-section view of a planar fuel cell including three cell cores arranged on a porous and impermeable substrate as disclosed by the invention.

The fuel compartment is thus sealed. The cell is then connected to the hydrogen via a pipe and a connector previously screwed into the dense material (FIG. 4).

The invention claimed is:

1. A planar fuel cell comprising:
    an electrically conductive, planar support comprising a homogeneous structure made of a thermoplastic polymeric material which is permeable to the fuel of the cell at least in a permeable area for diffusing the fuel, and which is impermeable in a sealed area on at least one outer face of the support, said impermeable sealed area being defined by a dense portion of the homogeneous structure consisting of the same thermoplastic polymeric material as that of said permeable area for diffusing the fuel; and
    a plurality of cell cores stacked and positioned on an outer face of the support in a non-sealed area;
    wherein the sealed area of the support is sealed after the cell cores are stacked on the non-sealed area of the support; and
    wherein the sealed area is sealed by exposing the surfaces of the support to be sealed to a temperature above a softening temperature of the thermoplastic polymeric material.

2. The planar fuel cell as claimed in claim 1, wherein the permeable area of the support is provided with channels.

3. The planar fuel cell as claimed in claim 1, wherein the permeable area of the support is porous.

4. The planar fuel cell as claimed in claim 3, wherein a porosity rate of the permeable area of the support is between 40 and 80%.

5. The planar fuel cell as claimed in claim 3, wherein the permeable area of the support has a pore size between 0.5 and 40 μm.

6. The planar fuel cell as claimed in claim 1, wherein the support has a thickness between 1 and 5 mm.

7. The planar fuel cell as claimed in claim 1, wherein the thermoplastic polymer is polyethylene.

8. The planar fuel cell as claimed in claim 1, wherein the thermoplastic polymer is vinylidene polyfluoride (PVDF).

* * * * *